United States Patent
Yadhav et al.

(10) Patent No.: US 12,210,854 B2
(45) Date of Patent: Jan. 28, 2025

(54) METHODS AND APPARATUSES FOR PROVIDING A FUNCTION AS A SERVICE PLATFORM

(71) Applicant: Telefonaktiebolaget LM Ericsson (publ), Stockholm (SE)

(72) Inventors: Vinay Yadhav, Upplands Väsby (SE); Joacim Halén, Sollentuna (SE); Amardeep Mehta, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 82 days.

(21) Appl. No.: 17/637,261

(22) PCT Filed: Aug. 23, 2019

(86) PCT No.: PCT/SE2019/050777
§ 371 (c)(1),
(2) Date: Feb. 22, 2022

(87) PCT Pub. No.: WO2021/040582
PCT Pub. Date: Mar. 4, 2021

(65) Prior Publication Data
US 2022/0283789 A1    Sep. 8, 2022

(51) Int. Cl.
*G06F 8/36* (2018.01)
*H04L 67/00* (2022.01)

(52) U.S. Cl.
CPC ............... *G06F 8/36* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 8,412,813 B2 | 4/2013 | Carlson et al. | |
| 10,230,571 B2 * | 3/2019 | Rangasamy | G06F 9/5072 |
| 10,609,530 B1 * | 3/2020 | Patil | H04L 41/122 |
| 10,809,984 B2 * | 10/2020 | Mizrahi | G06F 40/242 |
| 11,016,814 B2 * | 5/2021 | Hansmann | H04L 67/1019 |

(Continued)

FOREIGN PATENT DOCUMENTS

| | | | | |
|---|---|---|---|---|
| WO | WO-2018200135 A1 * | 11/2018 | | G06F 16/367 |
| WO | WO-2019018482 A1 * | 1/2019 | | G06F 9/5055 |

OTHER PUBLICATIONS

Orso, "Component Metadata for Software Engineering Tasks", 2001, Springer-Verlag Berlin (Year: 2001).*

(Continued)

*Primary Examiner* — Hossain M Morshed
(74) *Attorney, Agent, or Firm* — Rothwell, Figg, Ernst & Manbeck, P.C.

(57) ABSTRACT

Embodiments described herein provide methods and apparatuses for enabling use of functions in a function as a service platform by third party developers. A method comprises storing in a function catalogue one or more function descriptions associated with one or more respective functions available for use by third party developers, wherein each function description comprises an intent and a function name of the respective function; receiving a function call from a first function developer comprising an indication of a first intent; and selecting a first function description from the function catalog that matches the first intent.

18 Claims, 10 Drawing Sheets

(56) References Cited

U.S. PATENT DOCUMENTS

| | | | | |
|---|---|---|---|---|
| 11,050,607 | B2* | 6/2021 | Kröhling | H04L 63/0227 |
| 2006/0271537 | A1* | 11/2006 | Chandrasekharan | G06F 8/36 |
| 2014/0188970 | A1* | 7/2014 | Madhok | H04L 67/63 |
| | | | | 709/201 |
| 2016/0321064 | A1 | 11/2016 | Sankaranarsimhan et al. | |
| 2017/0060568 | A1 | 3/2017 | Siebert, Jr. et al. | |
| 2018/0034924 | A1* | 2/2018 | Horwood | H04L 67/10 |
| 2018/0205763 | A1* | 7/2018 | Seetharaman | H04L 63/30 |
| 2019/0004871 | A1* | 1/2019 | Sukhomlinov | G06F 9/541 |
| 2019/0042315 | A1* | 2/2019 | Smith | H04L 9/0637 |
| 2019/0272171 | A1* | 9/2019 | Chen | G06F 8/75 |
| 2020/0167134 | A1* | 5/2020 | Dey | G06F 8/65 |

OTHER PUBLICATIONS

International Search Report and Written Opinion issued in International Application No. PCT/SE2019/050777 dated Jun. 8, 2020 (13 pages).

* cited by examiner

Fig. 10

METHODS AND APPARATUSES FOR PROVIDING A FUNCTION AS A SERVICE PLATFORM

CROSS REFERENCE TO RELATED APPLICATION(S)

This application is a 35 U.S.C. § 371 National Stage of International Patent Application No. PCT/SE2019/050777, filed Aug. 23, 2019.

TECHNICAL FIELD

Embodiments described herein relate to methods and apparatus for enabling use of functions in a function as a service platform by third party developers. For example, methods described herein store in a function catalogue one or more function descriptions associated with one or more respective functions that are available for use by third part developers.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The Function as a Service (FaaS) paradigm of cloud service offerings allows consumers (developers) to build and deploy applications without the need to manage the complexity of provisioning and maintaining the infrastructure, platform or software ecosystem. This model of developing and deploying services lends itself to a "Serverless" architecture. Developers may define individual functions that make up a service, and may deploy the individual functions on the cloud platform, which are then invoked when the service functionality is needed. Functions in a FaaS platform may be started within milliseconds to handle the task they are defined to perform. Consumers may only pay the cloud provider when the functions that they have deployed are invoked. The FaaS paradigm lends itself well to the microservices software development architecture.

Figure 1:
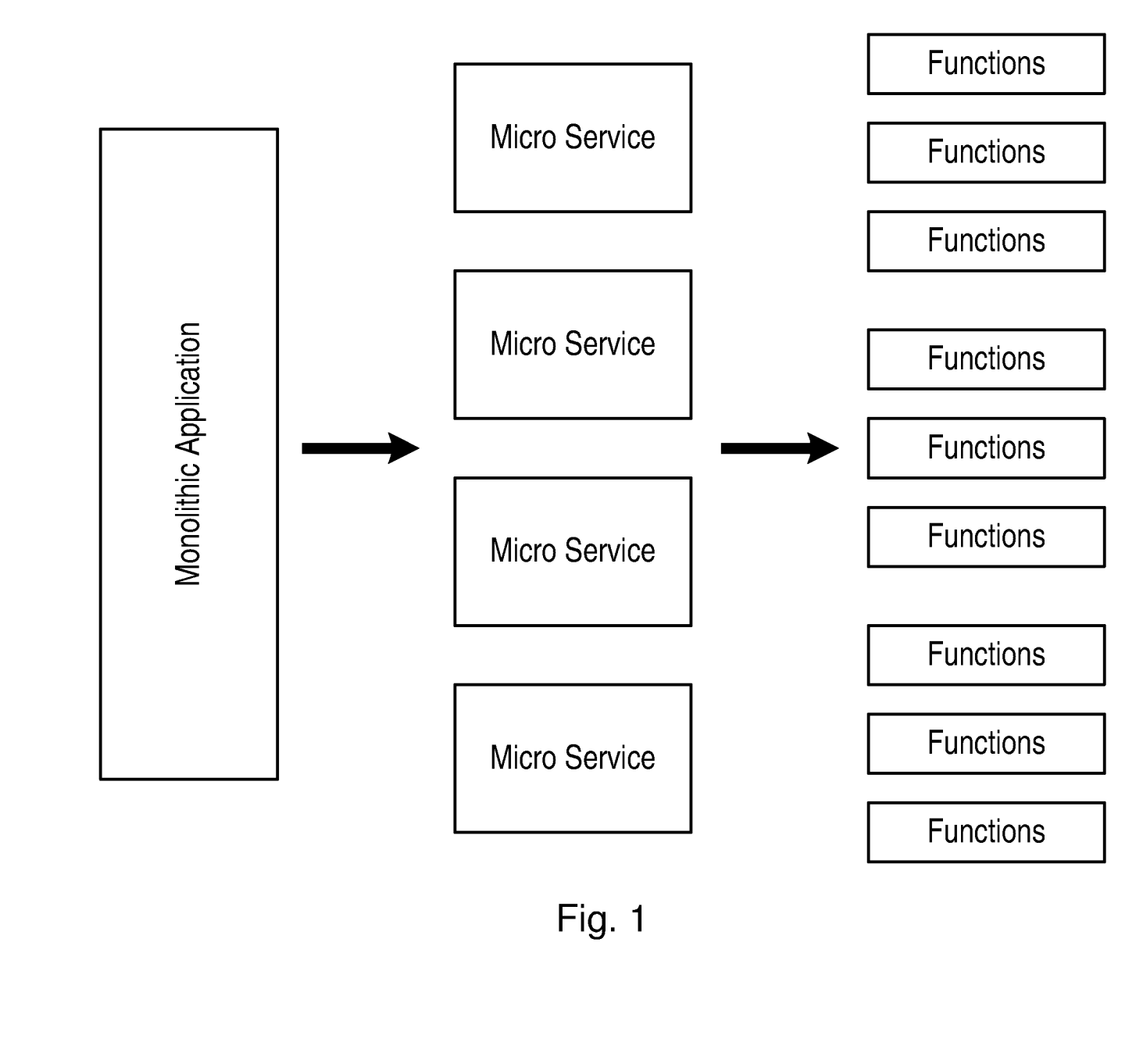
FIG. 1 illustrates an example of how a monolithic application may be broken down into a set of microservices that may be decomposed into a set of modular functions.

The developer may decompose the functionalities of an application or microservice into a set of modular functions which may then be uploaded to the FaaS platform. Each of the uploaded functions may be capable of being invoked and executed independently. The functions may also be scaled independently. FIG. 1 illustrates an example of how a monolithic application may be broken down into a set of microservices that may be decomposed into a set of modular functions.

Functions may be invoked as a result of trigger predefined by the developer, or functions may be invoked manually. A set of functions may be chained together to achieve complex tasks in the service or microservice.

Some of the advantages of a FaaS platform include and not limited to, reduced developer logistics, higher development and deployment pace, scalability, fault tolerance and paying for only active time of the function and not when idle.

Disadvantages include harder tracking of numerous functions, harder debugging and minimal debug tooling and decreased transparence into the infrastructure. Most of the current leaders in cloud platform providers today provide FaaS capabilities, for example, AWS Lambda, Google cloud functions, and Azure Functions. Current FaaS frameworks also suffer from vendor lock-in.

SUMMARY

According to some embodiments there is provided a method for enabling use of functions in a function as a service platform by third party developers. The method comprises storing in a function catalogue one or more function descriptions associated with one or more respective functions available for use by third party developers, wherein each function description comprises an intent and a function name of the respective function; receiving a function call from a first function developer comprising an indication of a first intent; and selecting a first function description from the function catalog that matches the first intent.

According to some embodiments there is provided a function as a service, FaaS, platform for enabling use of functions by third party developers. The FaaS platform comprises processing circuitry configured to store in a function catalogue one or more function descriptions associated with one or more respective functions available for use by third party developers, wherein each function description comprises an intent and a function name of the respective function; receive a function call from a first function developer comprising an indication of a first intent; and select a first function description from the function catalog that matches the first intent.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Most current Function as a Service (FaaS) platforms provide functionality for developers to define their own functions which can then be deployed to offer a service or an application. Except for some standard functions all the functions that form a service need to be written/developed by the developer themselves. To realize a fairly complex service using FaaS would require developing, testing and validating a large number of functions which may require a considerable effort.

As of today, there is no intuitive and simple way in which developers can build a service using a mix of functions that are defined by themselves and functions that are developed by other third party developers. There are no systems for discovering and calling functions defined by other parties as part of the service deployed by the developer. This in a way limits the potential and pace of development in a FaaS environment.

The current FaaS platforms do not provide a transparent way for a developer to expose the functions that they have developed to other developers on the FaaS platform. There is also no transparent and dynamic way for developers to discover and invoke functions exposed by other developers to build their service.

Embodiments described herein therefore provide methods and apparatus for enabling use of functions in a function as a service platform by third party developers.

In particular, the methods and apparatuses described herein enable developers to expose their functions transparently for other developers to use in a FaaS platform. Furthermore the methods and apparatuses described herein enable the FaaS platform to catalog functions that are exposed based on the functionality that they provide. The cataloguing of the functions may be performed in a searchable manner. Embodiments described herein also enable developers to dynamically search and invoke functions exposed by other developers using intent based function invocation.

Figure 2:
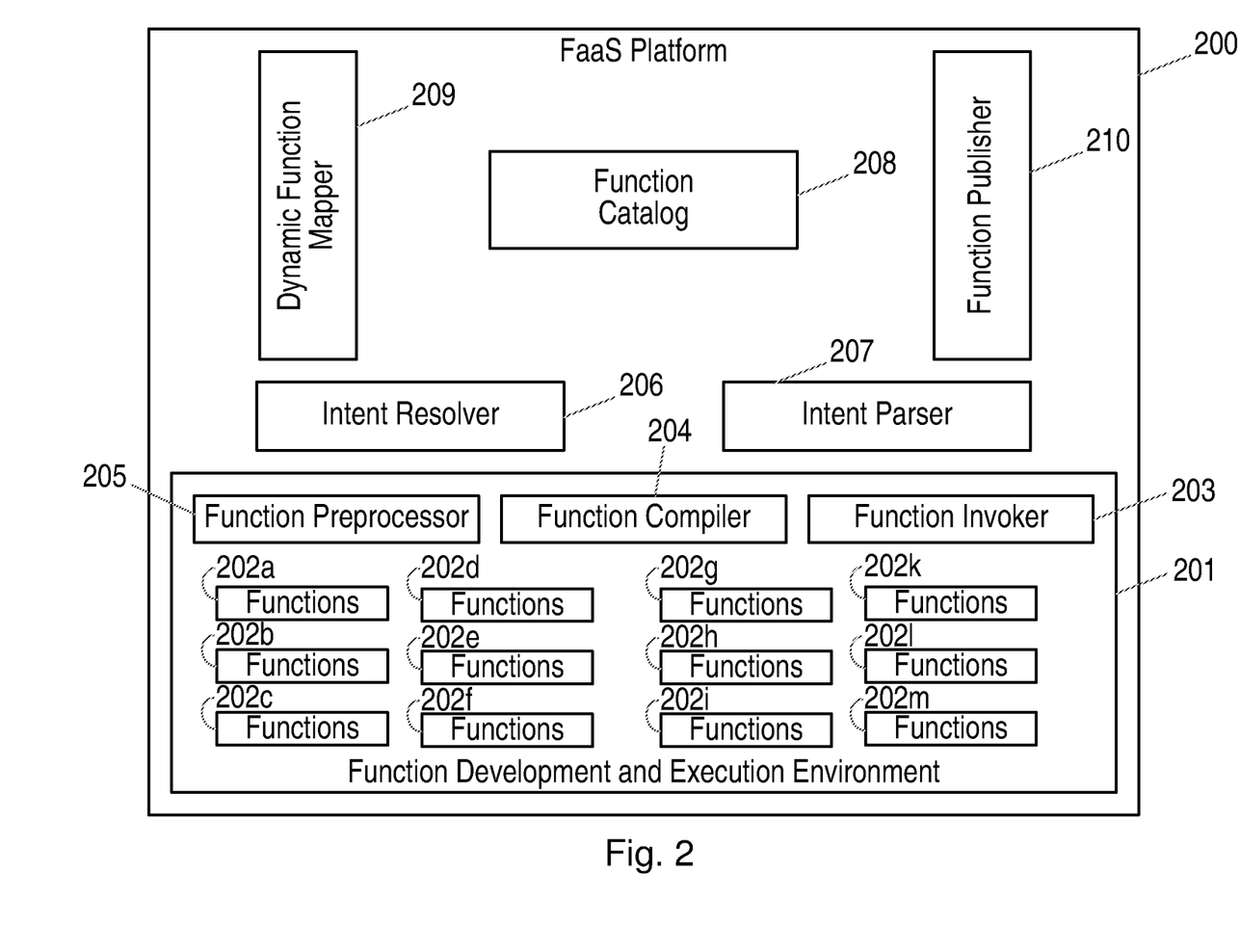
FIG. 2 illustrates an example of a FaaS platform according to some embodiments of the invention.

FIG. 2 illustrates an example of a FaaS platform according to some embodiments of the invention.

It will be appreciated that the functional blocks illustrated may be implemented by software code. In some circumstances a single piece of software may implement one or more of the functional blocks.

The FaaS Platform 200 supports the Function as a Service deployment paradigm. In particular the FaaS platform acts as a service deployment interface offered by the cloud platform provider to the consumers of to build services using FaaS.

The FaaS Platform 200 comprises a function development and execution environment 201. The function development and execution environment 201 comprises a functional block capable of allowing developers to define and/or develop functions, specify triggers for function invocation (also chain functions together to achieve a service functionality), and where the functions may be executed inside the FaaS platform 200. The function development and execution environment may also comprise a runtime environment needed to execute the functions.

In this example, the function development and execution environment 201 comprises functions 202a to 202m. The functions 202a to 202m may comprise individual pieces of code (or software) that a developer may write and deploy on the FaaS platform 200. These functions 202 may be executed when a pre-set condition is triggered or when invoked explicitly.

Depending on the cloud platform provider, a FaaS platform may allow developers to define functions in multiple languages.

In this example, the function development and execution environment 201 further comprises a function invoker 203. The Function Invoker 203 may comprise a functional block which may be responsible for invoking a function and executing it on the runtime environment required by the function. This function block may be instructed to invoke a function based on a predefined trigger or explicitly requested to invoke a function.

In this example, the function development and execution environment 201 further comprises a function compiler 204. The function compiler 204 comprises a functional block which may be used to compile a function defined by the developer. The function compiler 204 may also link a function with other libraries into an executable form in which to be invoked by the function invoker 203. The function compiler 204 may only be required when a function is defined in a language that needs to be compiled to be executed.

In this example, the function development and execution environment 201 further comprises a function preprocessor 205. The function preprocessor comprises a functional block which may be configured to preprocess a function defined by the developer to look for intent based function invocation directives. The intent based function invocation directives may be in the form of a keyword that the developer uses to indicate an intent based function invocation. The directive may take different forms based on the programming language that the function is being written in, and may be designed to feel intuitive to the developer.

Once the function preprocessor 205 detects an intent based function invocation directive, the function preprocessor may call an Intent resolver 206 to perform further processing. The function preprocessor 205 may be configured to preprocesses a function after the developer has written the function, or may be configured to preprocess a function periodically while the developer is writing the function in real-time to process and analyze an intent based function invocation.

In this example, the FaaS platform 200 further comprises an intent resolver 206. The intent resolver comprises a functional block that may be configured to resolve an intent indicated in a function call.

For example, the intent resolver 206 may determine a hierarchical search query that may be used to lookup available third-party functions that match the specified intent with in a function catalog.

Figure 5:
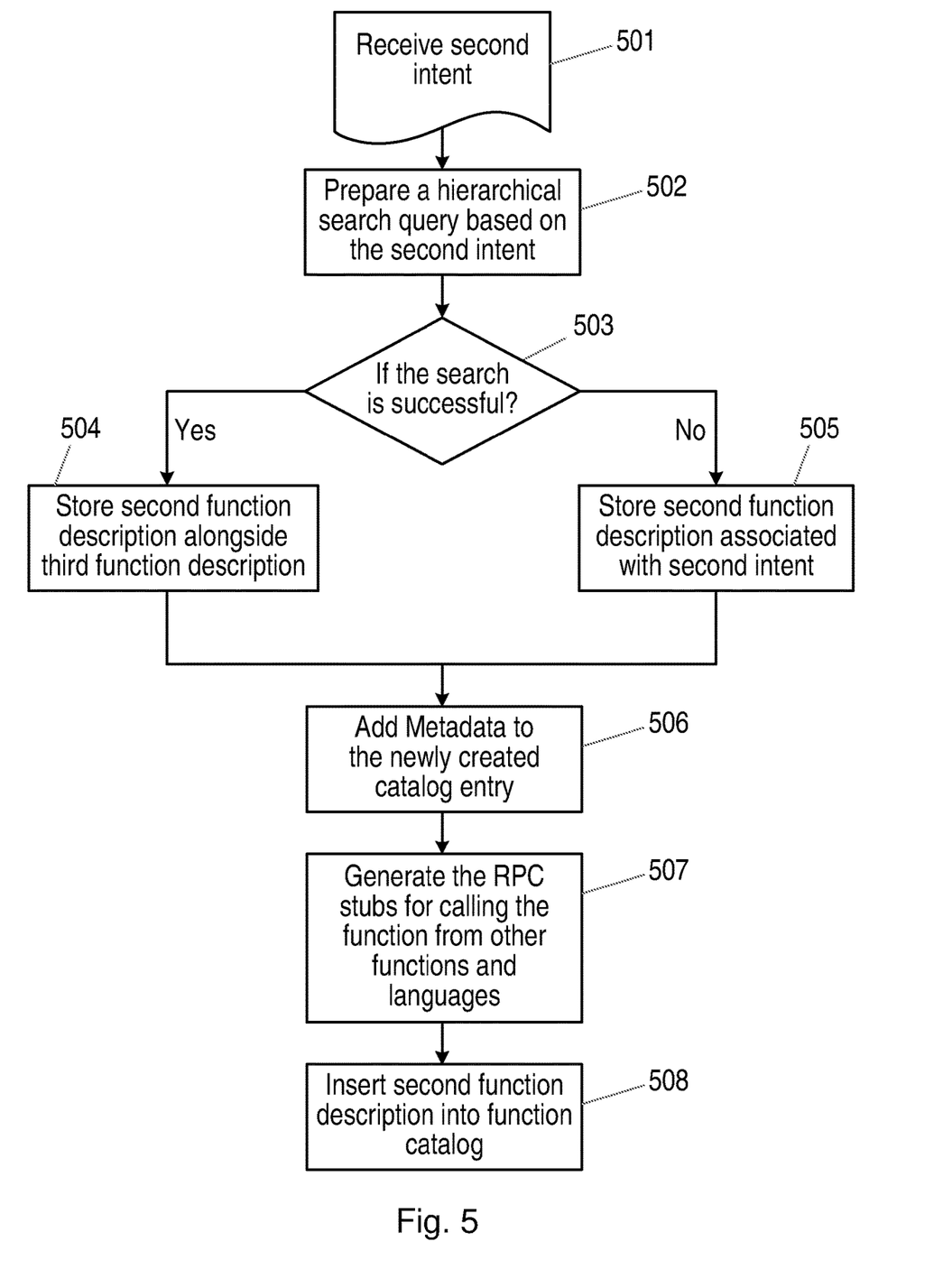
FIG. 5 illustrates a method for storing a second function description in a function catalog according to some embodiments.

In this example, the FaaS platform 201 further comprises an intent parser 207. The intent parser 207 comprises a functional block configured to prepare the intent classification of a function. For example, when developers want to make a function available for other developers, they may one or more intents which, along with the function signature (Parameters and return types), may be used by the intent parser to prepare an intent classification. FIG. 5 presents a flow chart for the functionality of the module.

In this example, the FaaS platform 201 further comprises a function catalog 208. The function catalog 208 comprises a functional block which may be configured as a database of all functions that are made available by developers for invocation by other developers. The function catalog 208 may be configured to store the functions in a hierarchical fashion based on the intent classification made by the intent parser 207. Additional metadata information about the function may also be stored by the function catalog 208 that may be used while searching for a function based on an intent indicated in a function call from a third-party developer.

In this example, the FaaS platform 201 further comprises a dynamic function mapper. 209. The dynamic function mapper 209 comprises a functional block which may be configured to dynamically invoke a function from the function catalog 208 based on an intent specified by a calling function. The dynamic function mapper 209 may select from one or more candidate functions in the function catalog 208 that match the intent and fulfill the constraints specified by the calling function.

In this example, the FaaS platform 201 further comprises a function publisher 210. The function publisher 210 comprises a functional block which may be configured to add a function to the function catalog 208. The function publisher 210 may use an intent classification prepared by the intent parser 207 to publish a function in the function catalog 208 along with, for example, information pertaining to the pricing, access level and other metadata information (such as version, geo-availability etc.) related to the function.

Figure 3:
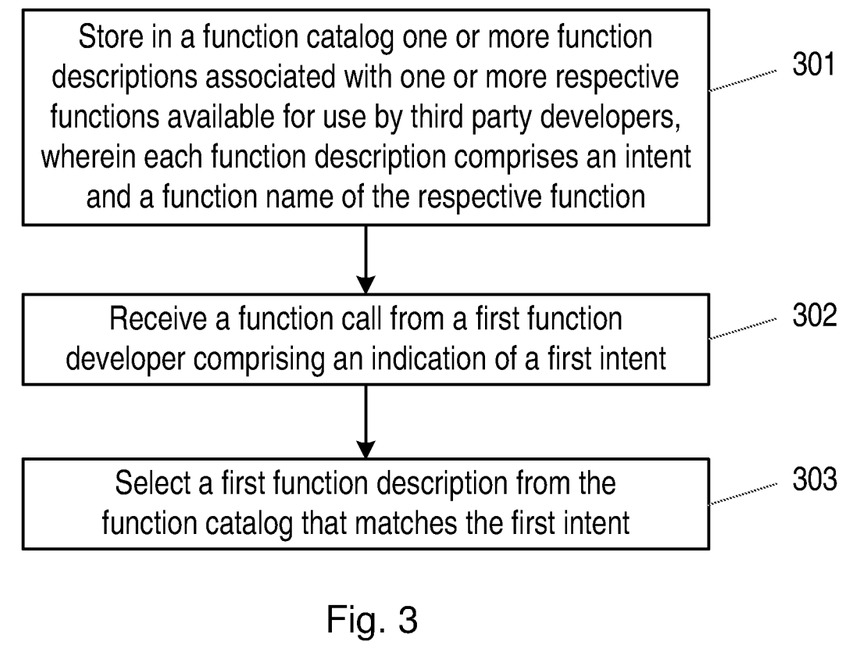
FIG. 3 illustrates a method for enabling use of functions in a function as a service platform by third party developers according to some embodiments.

FIG. 3 illustrates a method for enabling use of functions in a function as a service platform by third party developers according to some embodiments. The method illustrated in FIG. 3 may be performed by the FaaS platform illustrated in FIG. 1.

In step 301, the method comprises storing in a function catalog one or more function descriptions associated with one or more respective functions available for use by third party developers, wherein each function description comprises an intent and a function name of the respective function. For example, the function catalog may be the function catalog 208 illustrated in FIG. 2.

A function description may comprise enough information to allow the FaaS platform 201 to call the function associated with the function description. For example, the function name in the function description may comprise an remote procedure call (RPC) stub.

An intent of a function may comprise an indication of what the function does. As an example, a first function may be envisaged that is configured to receive a list as an input, and to output a sorted version of the list as an output. The first function may, for example, be configured to use a quick sort method to sort the list.

The intent of the first function may therefore be condensed into a first level intent of "sort" and a second (more granular) level intent of "quick sort". In other words, in this example, the first function's intent is to sort, and more specifically to perform a quick sort.

In step 302, the method comprises receiving a function call from a first function developer comprising an indication of a first intent.

In step 303, the method comprises selecting a first function description from the function catalog that matches the first intent.

For example, step 303 may comprise finding one or more candidate function descriptions from the function catalog that match the first intent. A candidate function description may match the first intent if the intent in the candidate function description would provide the first intent when implemented. In other words, the first intent may be to "sort", and the input parameter may be a list. A stored function description which has an intent comprising two levels (e.g. "sort" and "quick sort" as described above), may be considered to match the first intent as the intent of "sort" is provided when the stored function is implemented.

In step 304, the method comprises selecting the first function description from the one or more candidate function descriptions.

For example, in some cases there may be more than one stored function that has an intent that matches the first intent. For example, a first stored function which has the intent "sort" and "quick sort" and a second stored function which has then intent "sort" and "heapsort" may both be considered to match a first intent of "sort".

In cases where more than one candidate function description is found in step 303 therefore, the first function description may be selected from the one or more candidate function descriptions. The may be performed by the dynamic function mapper 209, for example, as described with reference to FIG. 9 below.

In some examples, the step 301 may comprise receiving function source code of a second function from a second function developer, wherein the function source code comprises a second intent of the second function and a function name. The method may then further comprise extracting the second intent from the function source code; and storing a second function description comprising the second intent and the function name in the function catalog. In particular, the intent parser 207 illustrated in FIG. 2 may be configured to extract the second intent from the function source code, for example, as illustrated with reference to FIG. 4 below.

The function publisher 210 maybe be configured to store the second function description in the function catalog, for example, as illustrated with reference to FIG. 5 below.

Figure 4:
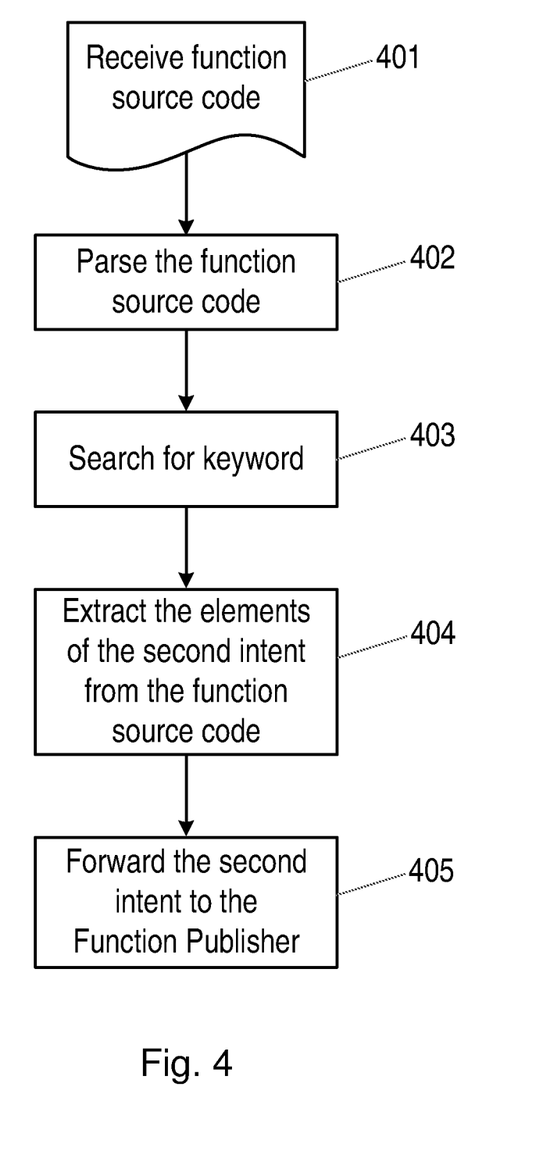
FIG. 4 illustrates a method of extracting the second intent from the function source code according to some embodiments.
Figure 6:
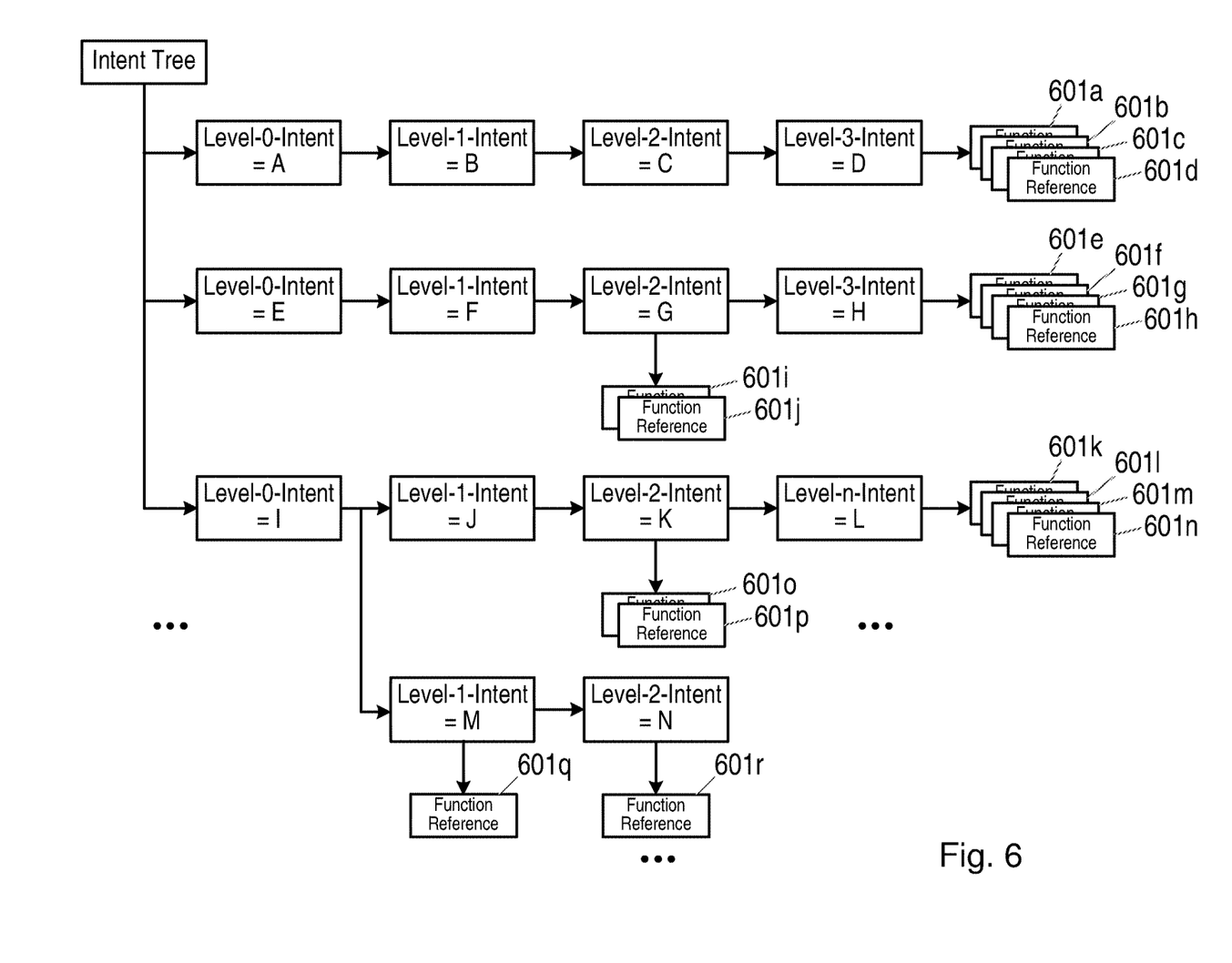
FIG. 6 illustrates an example of a function catalog maintaining an intent hierarchy map according to some embodiments.

FIGS. 4 to 6 relate to the publication of a new function for discovery by third party developers using intent based calling.

FIG. 4 illustrates a method of extracting the second intent from the function source code. The method may be performed by the intent parser 207 illustrated in FIG. 2.

In step 401, the intent parser 207 receives the function source code of a second function.

In step 402, the intent parser 207 comprises parses the function source code.

An example function source code may comprise the following structure in a line of the source code:
    <KEY_WORD>.<THIRD_PARTY_ID>.<INTENT_LEVEL1_0>.<INTENT_LEVEL_1>.<INTENT_LEVEL_N>.<FunctionName>.

In some examples, the intent parser performs step 403. In step 403, the intent parser searches for a keyword in the function source code indicating that the second function is to be made available to other function developers. In the example above, the keyword <KEY_WORD> may indicate that the second function is to be made available to other function developers.

In some examples, the following steps 404 and 405 may be performed in response to finding the keyword in the function source code.

In step 404, the method comprises extracting the elements of the second intent from the function source code. In the example illustrated above, the second intent may comprise the parts:
    <INTENT_LEVEL1_0>.<INTENT_LEVEL_1>.
      <INTENT_LEVEL_N> of the source code.

As previously described, an intent may be expressed according to one or more intent levels of increasingly fine granularity. In the example above, a first intent level <INTENT_LEVEL1_0> may indicate an intent of coarser granularity than a second intent level <INTENT_LEVEL_1>. The intent levels may then become increasingly fine in granularity until <INTENT_LEVEL_N>. For example <INTENT_LEVEL1_0> may be "sort", <INTENT_LEVEL_1> may then be for example, "quick sort" "heapsort" or bubblesort" and so on.

The <THIRD_PARTY_ID> may indicate the identity of the developer providing the second function.

The <FunctionName> may indicate the name of the second function. The <FunctionName> may then be used to store the second function description for the second function, and later call the second function.

Step 404 may also comprise extracting an indication of one or more input parameter types for the second function and one or more output parameter types of the second function and any other metadata association with the second function.

In step 405, the method comprises forwarding to the function publisher the second intent extracted in step 404. Step 405 may also comprise forwarding the one or more input parameter types for the second function and one or more output parameter types of the second function and any other metadata.

FIG. 5 illustrates a method for storing a second function description in a function catalog. The method of FIG. 5 may be performed by the function publisher 210 illustrated in FIG. 2.

In step 501, the function publisher 210 receives the second intent from the intent parser. In step 501, the function publisher may also receive the one or more input parameter types for the second function and the one or more output parameter types for the second function, and/or any other metadata associated with the second function.

In steps 502 and 503, the function publisher 210 determines whether the function catalogue already comprises a third function description comprising the second intent.

For example, in step 502, the function publisher prepares a hierarchical search query based on the second intent, and searches the function catalog for a catalog entry having the same intent.

In the example illustrated above therefore, the function publisher would search for a catalog entry having an intent matching the second intent:
    <INTENT_LEVEL1_0>.<INTENT_LEVEL_1>.
      <INTENT_LEVEL_N>.

In step 503, the function publisher 210 then determines if the search has been successful.

The function catalog may comprise a repository that stores the functions that can be called using an intent based function call.

FIG. 6 illustrates an example of a function catalog maintaining an intent hierarchy map.

In this example, the function catalog maintains an intent hierarchy map. Each catalog entry 601a to 601r, is stored associated with a branch of a hierarchy tree which is broken down by intent level.

For example, a branch of the hierarchy tree may be associated with intent level 1=A. (where A is some intent function, for example "sort"). In some cases, the intent specified by a function source code may only comprise one level, and in those cases, the catalog entry for the function would be stored associated with this branch of the hierarchy tree. However, in this further intent levels are associated with the intent level 1=A branch. For example, intent level 2=B is also present, and intent level 3=C etc.

In this example therefore, the catalog entries 601a t 601d comprise function descriptions which are associated with the intent level 0="A", the intent level 1="B", the intent level 2="C", and the intent level 3="D".

In a similar fashion, the catalog entries 601e to 601h are associated with intent level 0="E", intent level 1="F", intent level 2="G" and intent level 3="H". Where the levels "E" to "H" define the function intent with increasingly fine granularity.

The catalog entries 601i and 601j are associated with intent level 0="E", intent level 1="F", and intent level 2="G". The intents that were defined by these functions were therefore less granular than the catalog entries 601e to 601h.

The remaining catalog entries 601k to 601r are similarly associated with intent levels in the hierarchy tree.

Storing the catalog entries in this way may save memory in the function catalog as the information relating to the intent of a function does not have to be repeated for each catalog entry.

Along with the function database, the function catalog also stores the RPC stubs for the functions in different languages, which may be required for calling a function from another function defined in a different language but using intent based call.

The function catalog may also store metadata associated with each of the function that may be used to decide while dynamically mapping an intent based call to a function. The Metadata information can include information related to pricing, geo-availability, runtime statistics and any other relevant information.

Returning to FIG. 5 responsive to determining that the function catalog comprises a third function description comprising the second intent (for example, responsive to determining that the search is successful in step 503), the method passes to step 504 in which the function publisher 210 stores the second function description alongside the third function description associated with the second intent.

For example, referring to FIG. 6, if the second intent was equal to intent level 1="E", intent level 2="F" and intent level 3="G", then the second function description would be stored alongside the catalog entries 601*i* and 601*j*.

Alternatively, responsive to determining that the function catalogue does not comprise a third function description comprising the second intent, the method passes to step 505 in which the function publisher 210 stores the second function description associated with the second intent. For example, if the second intent is intent level 0="E" and intent level 1="F" but not specifically that intent level 2="G", then the second function description may be stored associated with the intent level 1="F".

In some examples, the second intent may comprise an intent level that is not yet stored in the function catalog. In these examples a new branch of the function catalog tree may be created.

For example, the second intent may be equal to intent level 0="E", intent level 1="F" and intent level 2="O". In this example, a new branch may be created off intent level 1="F", in which intent level 2="O".

In step 506, the function publisher may add any metadata associated with the second function to the second function description before it is then stored in the function catalog.

In step 507, the function publisher 210 may create one or more RPC stubs for the second function in different languages and may store the RPC stubs in the second function description.

In step 508, the function publisher inserts the second function description into the function catalog appropriately.

Figure 7:
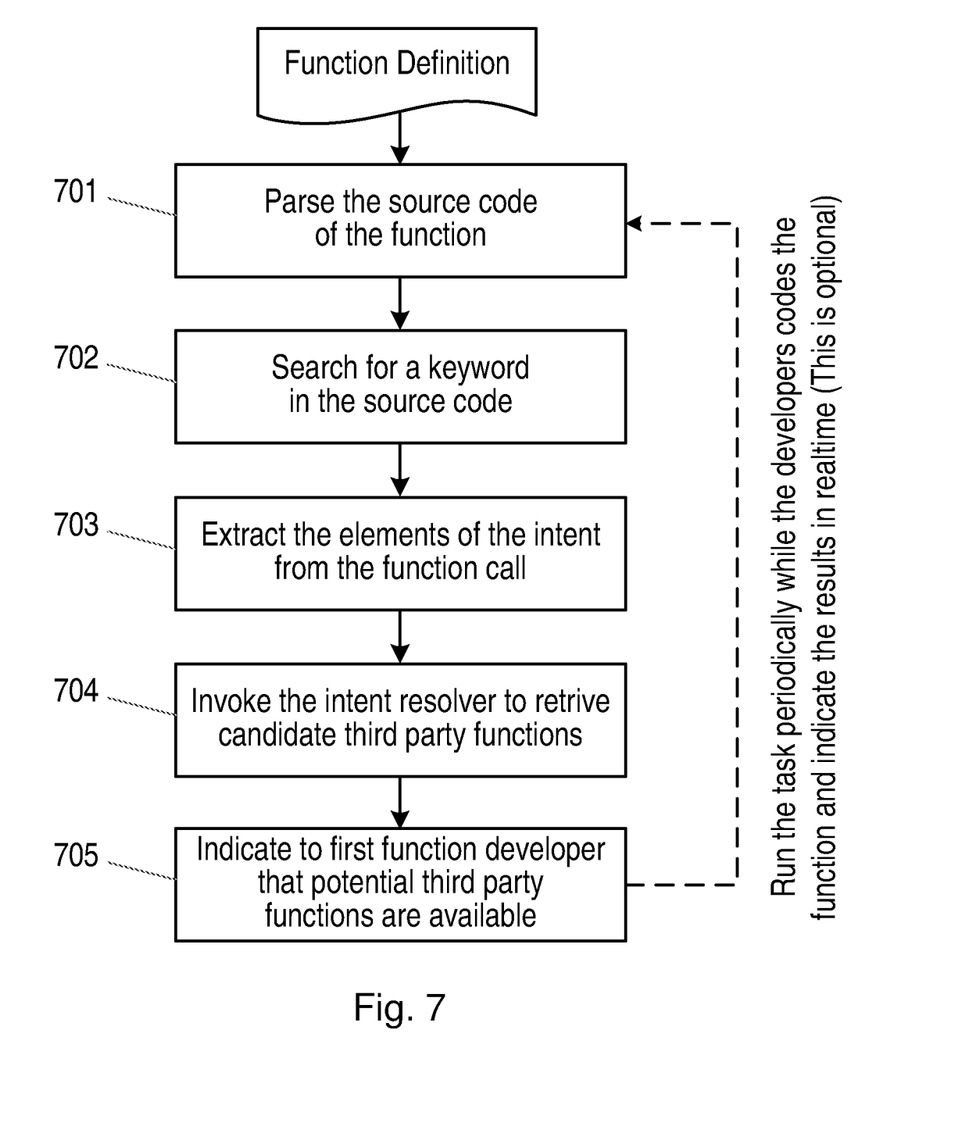
FIG. 7 illustrates a method of preprocessing function source code defined by a first function developer according to some embodiments.
Figure 8:
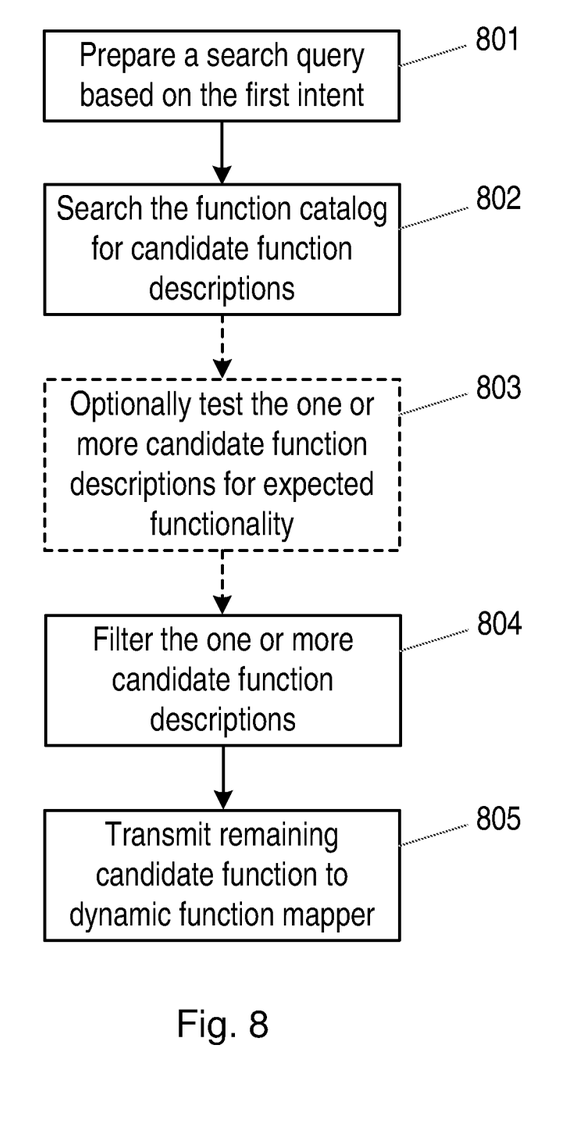
FIG. 8 illustrates a method of finding one or more candidate function descriptions from the function catalogue that match the first intent according to some embodiments.
Figure 9:
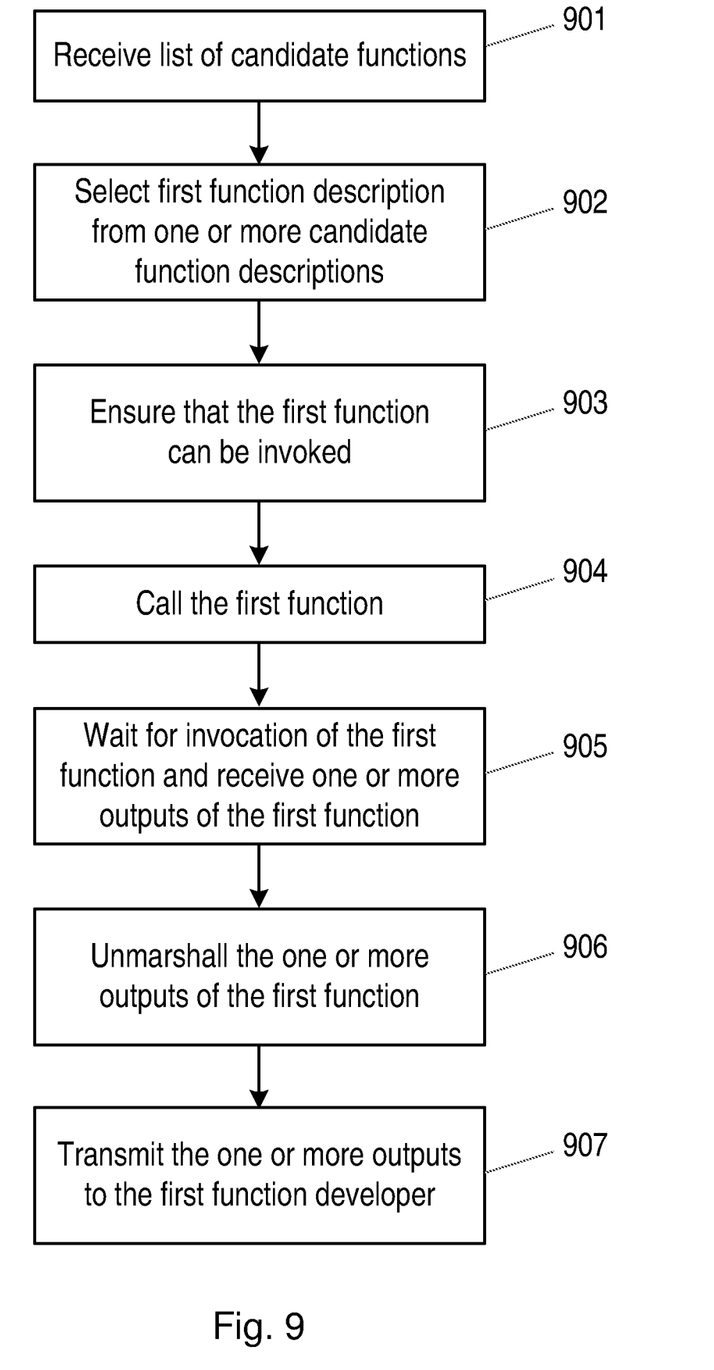
FIG. 9 illustrates method of calling the first function according to some embodiments.

FIGS. 7 to 9 relate to the intent based calling of a published function.

FIG. 7 illustrates a method of preprocessing function source code defined by a first function developer. The method of FIG. 7 may be performed by the function preprocessor 205 illustrated in FIG. 2.

The method illustrated in FIG. 7 may be performed after a developer has written a function, or it may be run periodically while the developer is writing the function in real-time to process and analyse whether an intent based function invocation is being written into the function.

In particular, step 302 of FIG. 3 may comprise the features of step 701 below. In step 701, the function preprocessor 205 parses the source code of the function written or being written by the first function developer. The source code of the function may comprise the function call from the first function developer comprising the indication of the first intent. The function call in the source code of the function may therefore be calling a third part for use within the function that the first function developer has written or is writing.

In step 702, the function preprocessor 205 may search for a keyword in the source code of the function. The keyword may indicate that the function is intending to call a third party function using intent invocation. The keyword may take different forms depending on the language being used by the first function developer to write the function. In particular, the keyword may be designed to be intuitive to the first function developer.

In step 703, the function preprocessor 205 may extract elements of the intent from the function call.

The function call may be structures as follows:
<KEY_WORD>.<THIRD_PARTY_ID>.<LEVEL_0_INTENT>.<LEVEL_1_INTENT>.<LEVEL_N_INTENT>.call([Param1, Param2, . . . , ParamN], [ReturnParam1, ReturnParam2, . . . , ReturnParamN], [Additional Constraint]).

Here the <KEY_WORD> indicates that the function is intending to call a third part function using intent invocation. The <THIRD_PARTY_ID> is an optional parameter that indicates the identity of the third party developer whose function the call is intending to invoke. The parameters <LEVEL_0_INTENT>, <LEVEL_1_INTENT> and <LEVEL_N_INTENT> indicate the first intent of a function that the developer wants to call. The first intent comprises intent levels, as described above.

The type of input parameters of the function that the first function developer wants to call are listed as ([Param1, Param2, . . . , ParamN]; and the expected output parameter types of the function that the first function developer wants to call as listed as [ReturnParam1, ReturnParam2, . . . , ReturnParamN].

The function call may also comprise one or more additional constraints indicated by the first function developer relating to the function to be called. For example, the additional constraint may relate to, for example, the cost of utilizing the called function, the location of the called function, the speed of operation of the called function, or any other metadata that may be associated with the called function.

An example of an intent based call that follows the format described above would be:
THIRD_PARTY_FN.Ericsson.Sort.Quic_Sort.call ([original_list], [sorted_list], ["location": "SE"])
Here:
<KEY_WORD>==THIRD_PARTY_FN
<THIRD_PARTY_ID>==Ericsson
<LEVEL_0_INTENT>==Sort
<LEVEL_1_INTENT>==Quic_Sort
<Param1>==original list (This is the input to the function, the datatype can be derived from the variable)
<ReturnParam1>==sorted list (This is the output from the function, the datatype can be derived from the variable)
<Additional_Constrain>=="Location": "SE" (This is an example of a constrain that indicates the prospective function should be able to run inside location: SE)
Another Example:
THIRD_PARTY_FN.*.Sort.*.call([list], [sorted_list], ["location": "SE", "Price": "Lowest"])
The intent here is to find a sort algorithm from any vendor and any sort method (quick, heap, bubble), with the constrain that it has to run in SE and it should be cheap to invoke.

Another example of an intent based function call is provided below:
THIRD_PARTY_FN.*.hash.sha-2.512-bits.call([Message, Len], [Digest], ["Time": "Fastest"])
Here the developer is trying to invoke a hash function that uses the sha-2 standard with 512 bit digest; the developer also passes the message to be hashed and length of the message as input parameters and expects a Digest as a return value. The developer has also specified that the function selected to be invoked should be the fasted available implementation; also in the above example the developer has used a wildcard '*' for the <THIRD_PARTY_ID> to specify that the FaaS platform can choose a function from any available third party developers.

In step 704, the function preprocessor invokes the intent resolver 206 to retrieve candidate third party functions that match the first intent. For example, the function preprocessor may transmit the first intent to the intent resolver. The function preprocessor may also transmit the other parameters indicated in the function call.

In step 705, responsive to the intent resolver 206 finding one or more candidate functions, the function preprocessor may indicate to the first function developer that potential third party functions are available to implement the function call in the source code of the function that the first function developer has written or is writing.

FIG. 8 illustrates a method of finding one or more candidate function descriptions from the function catalogue that match the first intent. The method illustrated in FIG. 8 may be performed by the intent resolver 206 illustrated in FIG. 2.

In step 801, the intent resolver 206 prepares a search query based on the first intent. For example, where the function catalog comprise a hierarchy map as illustrated in FIG. 6, the search query may comprise a hierarchy search query based on an order of granularity of intent levels in the first intent.

In step 802, the intent resolver 206 searches the function catalog for 208 for candidate function descriptions that match the first intent. For the example in which a hierarchy map is used as the function catalog, the intent resolver may locate the first intent in the hierarchy map, and any catalog entries stored associated with the first intent may be selected as candidate functions that match the first intent.

For example, say the first intent specified intent level 0="E" intent level 1="F", intent level 2="G". In this example, from the hierarchy map illustrated in FIG. 6, the intent resolver may determine that the catalog entries 601*i* and 601*j* match the first intent. The intent resolver may also determine that the catalog entries 601*e* to 601*h* also match the first intent as they also provide the same first three intent levels.

In some examples, the intent resolver may only search for function descriptions that were provided by a third party developer that is indicated in the function call.

In step 803, the intent resolver 206 may optionally test the one or more candidate function descriptions to check for expected functionality of the one or more candidate function descriptions. For example, the intent resolver may input the input parameters indicated in the function call into the one or more candidate functions, and may check that the outputs returned by the one or more candidate functions of an expected type of output.

In step 804, the intent resolver 206 may filter the one or more candidate functions that we found in step 802. For example, the intent resolver may filter the candidate functions based on one or more additional constraints indicated in the function call. For example, if the function call included an additional constraint that the function be as cheap as possible, the intent resolver may only select the cheapest candidate functions.

In step 805 the intent resolver 206 transmits the remaining list of candidate functions to the dynamic function mapper 209. In some examples, the intent resolver 206 may also transmit any metadata associated with the candidate functions that was stored in the function catalog.

FIG. 9 illustrates method of calling the first function. The method illustrated in FIG. 9 may be performed by the dynamic function mapper 209 illustrated in FIG. 2.

In step 901, the dynamic function mapper 209 receives the list of candidate functions from the intent resolver 206.

In step 902, the dynamic function mapper selects the first function description from the one or more candidate functions. In some examples, the selection of the first function description from the one or more candidate function descriptions may be based on the additional constraints included in the function call.

In step 903 the dynamic function mapper may ensure that the first function can be invoked. If the first function cannot be invoked, the dynamic function mapper may either undergo procedures to ensure that the first function can be invoked, or may select a different function from one or more the candidate functions.

In step 904, the dynamic function mapper 209 calls the first function using a first function name in the first function description and one or more input parameters indicated in the function call. For example, the dynamic function mapper may marshall the input parameters from the function call onto an RPC call to the first function.

In step 905, the dynamic function mapper 209 waits for the invocation of the first function and receives the one or more outputs of the first function from the first function.

In step 906, the dynamic function mapper 209 unmarshalls the one or more outputs of the first function.

In step 907, the dynamic function mapper 209 transmits the one or more outputs to the first function developer. For example, the dynamic function mapper may populate the one or more outputs into the return variables of the function call.

Figure 10:
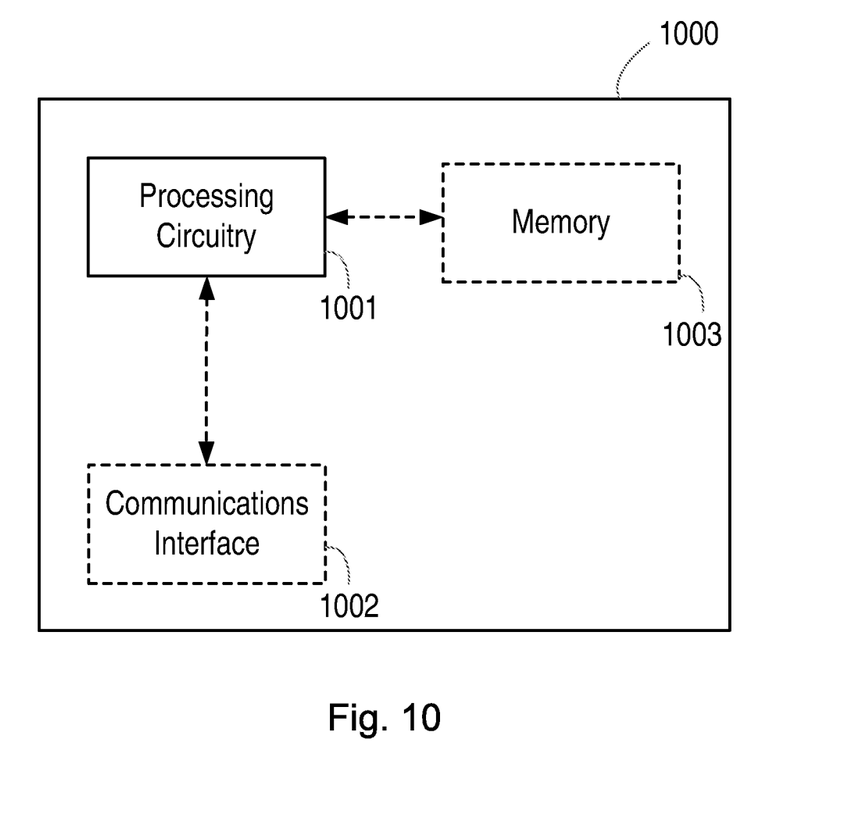
FIG. 10 illustrates a Function as a Service (FaaS) Platform comprising processing circuitry (or logic).

FIG. 10 illustrates a Function as a Service (FaaS) Platform 1000 comprising processing circuitry (or logic) 1001. It will be appreciated that the FaaS platform 1000 may comprise one or more virtual machines running different software and/or processes. The FaaS platform 1000 may therefore comprise one or more servers, switches and/or storage devices and/or may comprise cloud computing infrastructure that runs the software and/or processes.

The FaaS platform 1000 may comprise the FaaS platform 310 as described above. The processing circuitry 1001 controls the operation of the FaaS platform 1000 and can implement the method described herein in relation to an FaaS platform 1000. The processing circuitry 1001 can comprise one or more processors, processing units, multi-core processors or modules that are configured or programmed to control the FaaS platform 1000 in the manner described herein. In particular implementations, the processing circuitry 1001 can comprise a plurality of software and/or hardware modules that are each configured to perform, or are for performing, individual or multiple steps of the method described herein in relation to the FaaS platform 1000 or FaaS platform 310.

Briefly, the processing circuitry 1001 of the FaaS platform 1000 is configured to: store in a function catalogue one or more function descriptions associated with one or more respective functions available for use by third party developers, wherein each function description comprises an intent and a function name of the respective function; receive a function call from a first function developer comprising an indication of a first intent; and select a first function description from the function catalog that matches the first intent.

In some embodiments, the FaaS platform 1000 may optionally comprise a communications interface 1002. The communications interface 1002 of the FaaS platform 1000 can be for use in communicating with other nodes, such as other virtual nodes. For example, the communications interface 1002 of the FaaS platform 1000 can be configured to transmit to and/or receive from other nodes or network functions requests, resources, information, data, signals, or similar. The processing circuitry 1001 of FaaS platform 1000 may be configured to control the communications interface 1002 of the FaaS platform 1000 to transmit to and/or receive from other nodes or network functions requests, resources, information, data, signals, or similar.

Optionally, the FaaS platform 1000 may comprise a memory 1003. In some embodiments, the memory 1003 of the FaaS platform 1000 can be configured to store program code that can be executed by the processing circuitry 1001 of the FaaS platform 1000 to perform the method described herein in relation to the FaaS platform 1000 or the FaaS platform 310. Alternatively or in addition, the memory 1003 of the FaaS platform 1000, can be configured to store any requests, resources, information, data, signals, or similar that are described herein. The processing circuitry 1001 of the FaaS platform 1000 may be configured to control the memory 1003 of the FaaS platform 1000 to store any requests, resources, information, data, signals, or similar that are described herein.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for enabling use of functions in a function as a service platform by third party developers, the method comprising:
    obtaining metadata for a first function, wherein the metadata comprises first intent information specifying a first intent of the first function;
    extracting the first intent information specifying the first intent of the first function from the metadata for the first function;
    after extracting the first intent information from the metadata for the first function, preparing a function description for the first function, wherein the function description for the first function comprises the first intent information that was extracted from the metadata and a function name of the first function;
    after preparing the function description for the first function, storing the function description in a function catalogue;
    receiving a function call from a first function developer comprising an indication of a requested intent; and
    after receiving the function call, determining, based on the requested intent, a set of one or more candidate function descriptions from the function catalog, wherein each determined candidate function description from the function catalog comprises an intent that matches the requested intent, wherein
    the method further comprises, prior to obtaining the metadata for the first function, receiving function source code for the first function,
    the metadata comprising the first intent information is included in the function source code for the first function,
    obtaining the metadata for the first function comprises locating the metadata within the function source code for the first function,
    the metadata within the function source code begins with a keyword, and
    the keyword indicates that the first function is to be made available to function developers.

2. The method of claim 1, wherein the method further comprises:
    calling a function identified by one of the candidate function descriptions;
    receiving an output from the called function; and
    providing the output to a function developer.

3. The method of claim 1, wherein
    locating the metadata within the function source code comprises parsing the function source code to locate a specific keyword in the function source code, wherein the keyword indicates that the first function is to be made available to function developers and indicates the location of the metadata, and
    the step of storing the function description in the function catalog is performed as a result of determining that the function source code for the first function comprises the keyword.

4. The method of claim 1, wherein
    the function source code for the first function further comprises an indication of one or more input parameter types for the first function and one or more output parameter types of the first function, and
    the method further comprises:
    extracting one or more input parameter types for the first function and one or more output parameter types of the first function; and
    adding the one or more input parameter types for the first function and one or more output parameter types of the first function to the first function description.

5. The method of claim 1, wherein
    the metadata for the first function further comprises second intent information specifying a second intent for the first function,
    the function description for the first function further comprises the second intent information, and
    the second intent for the first function is more specific than the first intent for the first function.

6. The method of claim 1, wherein the step of storing the first function description comprises:
    determining that the function catalogue already comprises a second function description comprising the first intent; and
    responsive to determining that the function catalogue comprises a second function description comprising the first intent, storing the first function description alongside the second function description associated with the first intent.

7. The method of claim 1, wherein the first intent is expressed according to one or more intent levels of increasingly fine granularity.

8. The method of claim 1, wherein
    the method further comprises selecting a particular function description from the set of candidate function descriptions,
    the step of selecting the particular function description from the one or more candidate function descriptions comprises testing the one or more candidate function descriptions to check for expected functionality of the one or more candidate function descriptions, and the step of selecting the particular function description from the one or more candidate function descriptions comprises selecting from the particular candidate description based on i) metadata in the one or more candidate function descriptions relating to use of the respective functions and ii) one or more constraints in the function call.

9. A function as a service (FaaS) platform for enabling use of functions by third party developers, the FaaS platform comprising processing circuitry configured to perform a method comprising:
obtaining metadata for a first function, wherein the metadata comprises first intent information specifying a first intent of the first function;
extracting the first intent information specifying the first intent of the first function from the metadata for the first function;
after extracting the first intent information from the metadata for the first function, preparing a function description for the first function, wherein the function description for the first function comprises the first intent information and a function name of the first function;
after preparing the function description for the first function, storing the function description in a function catalogue;
receiving a function call from a first function developer comprising an indication of a requested intent; and
after receiving the function call, determining, based on the requested intent, a set of one or more candidate function descriptions from the function catalog, wherein each determined candidate function description from the function catalog comprises an intent that matches the requested intent, wherein
the method further comprises, prior to obtaining the metadata for the first function, receiving function source code for the first function,
the metadata comprising the first intent information is included in the function source code for the first function,
obtaining the metadata for the first function comprises locating the metadata within the function source code for the first function,
the metadata within the function source code begins with a keyword, and
the keyword indicates that the first function is to be made available to function developers.

10. The FaaS platform of claim 9, wherein the method further comprises:
calling a function identified by one of the candidate function descriptions;
receiving an output from the called function; and
providing the output to a function developer.

11. The FaaS platform of claim 9, wherein
obtaining the metadata for the first function comprises receiving function source code for the first function, wherein the function source code for the first function comprises the metadata for the first function and the metadata for the first function comprises the first intent for the first function and the function name of the first function.

12. The FaaS platform of claim 11, wherein the method further comprises:
after receiving the function source code for the first function, determining that function source code for the first function comprises a keyword indicating that the first function is to be made available to function developers wherein
the step of storing the function description in the function catalog is performed as a result of determining that the function source code for the first function comprises the keyword.

13. The FaaS platform of claim 11, wherein
the function source code for the first function further comprises an indication of one or more input parameter types for the first function and one or more output parameter types of the first function, and
the method further comprises:
extracting one or more input parameter types for the first function and one or more output parameter types of the first function; and
adding the one or more input parameter types for the first function and one or more output parameter types of the first function to the first function description.

14. The FaaS platform of claim 11, wherein
the metadata for the first function further comprises a second intent for the first function,
the function description for the first function further comprises the second intent for the first function, and
the second intent for the first function is more specific than the first intent for the first function.

15. The FaaS platform of claim 11, wherein the step of storing the first function description comprises:
determining that the function catalogue already comprises a second function description comprising the first intent; and
responsive to determining that the function catalogue comprises a second function description comprising the first intent, storing the first function description alongside the second function description associated with the first intent.

16. The FaaS platform of claim 11, wherein the first intent is expressed according to one or more intent levels of increasingly fine granularity.

17. The FaaS platform of claim 9, wherein
the method further comprises selecting a particular function description from the set of candidate function descriptions,
the step of selecting the particular function description from the one or more candidate function descriptions comprises testing the one or more candidate function descriptions to check for expected functionality of the one or more candidate function descriptions, and
the step of selecting the particular function description from the one or more candidate function descriptions comprises selecting from the particular candidate description based on i) metadata in the one or more candidate function descriptions relating to use of the respective functions and ii) one or more constraints in the function call.

18. A non-transitory computer readable medium storing a computer program comprising instructions which, when executed on at least one processor, cause the at least one processor to carry out the method of claim 1.

* * * * *